Patented Feb. 11, 1930

1,747,047

UNITED STATES PATENT OFFICE

LINN BRADLEY, OF MONTCLAIR, NEW JERSEY, AND EDWARD P. McKEEFE, OF NEW YORK, N. Y., ASSIGNORS TO BRADLEY-McKEEFE CORPORATION, OF NEW YORK, N. Y., A CORPORATION OF NEW YORK

TREATMENT OF RESIDUAL LIQUORS, ETC.

No Drawing. Application filed March 28, 1921. Serial No. 456,187.

This invention relates to improvements in the treatment and utilization of residual liquors from processes of cooking wood chips and similar material for the production of wood pulp therefrom; and more particularly it relates to the treatment of such residual liquors for the production therefrom of cooking liquors for use in the further carrying out of pulp-making operations.

In the cooking of wood chips, three processes are commonly used, known as the soda process, wherein the chips are cooked in a solution of caustic soda; the sulfite process, wherein the chips are cooked with a solution of acid sulfite or bisulfite; and the sulfate process, wherein the chips are cooked with a mixed solution of sodium hydroxide and sodium sulfide. In the sulfite process the spent cooking liquor is commonly run to waste and is a source of pollution of the bodies of water into which it is discharged. In the soda and sulfate processes, the waste or spent cooking liquors are commonly concentrated and calcined for the recovery of compounds for reuse in the same processes.

The present invention includes improvements in the treatment of residual liquors from the sulfite process, when carried out with a sulfite cooking liquor containing a sulfite of an alkali, as well as improvements in the treatment of residual liquors from the soda pulp process, or a modified soda pulp process, when carried out in conjunction with such a sulfite process. That is, the present invention includes improvements in the treatment of residual liquors from the individual processes themselves, as well as from combinations of such individual processes.

According to the present invention, the waste liquor from the pulp process is advantageously utilized in the production of a cooking liquor for use in the same process, or for use in a different process carried out in conjunction therewith.

According to one embodiment of the invention, we carry out the sulfite process with an acid sulfite liquor containing a sulfite of an alkali together with a sufficient excess of free sulfurous acid or acid sulfite, and we treat the resulting waste sulfite liquor for the regeneration of a cooking liquor for further use in this acid sulfite process.

According to another embodiment of the invention we carry out such an acid sulfite process (in which an alkali monosulfite or bisulfite is employed) in conjunction with an alkali process, such as the soda pulp process, and these processes are so combined that the waste liquor from one process is utilized in the production of a cooking liquor for the other process.

The present invention also includes treatment of residual liquors from a new and improved method of digestion or cooking, according to which the digestion or cooking operation is carried out with an alkaline sulfite liquor, that is, with a cooking liquor containing both caustic soda and sodium sulfite, in regulated proportions.

The present invention also includes certain combinations of the above processes according to which the waste liquor from the different processes are treated either for the production of a further cooking liquor for use in the same process or for the production of a cooking liquor to be used in another process, or in part for the same process and in part for a different process or processes.

The nature and advantages of the invention will more fully appear from the following more detailed description.

In the practice of the invention, according to one embodiment thereof, we first carry out the soda process of cooking chipped wood, that is, we cook the chips with a solution contain sodium hydroxide by digestion under pressure and at a temperature in excess of 100° C. The chipped wood may thus be subjected to digestion with caustic soda liquor of a strength of about 60 to 90 grams of caustic soda (NaOH) per litre, and containing around 60 to 90% of the soda as caustic soda (the remainder being mostly sodium carbonate and sodium sulfite). About 700 to 1100 gallons of the caustic soda solution are usually used for a cord of wood (measured before chipping), and the digester is usually heated by direct steam at a pressure which may vary from about 90 to 140 pounds, and for a suitable period of time, for example, from three to five hours. The liquor is usually circulated within the digester by the steam during the digestion or cooking. The strength of the liquor and the time of treatment will vary somewhat according to the kind, quality and condition of the wood treated. The digester is "blown" at the end of the cook and the pulp is separated from the black liquor and washed preferably with hot water. The black liquor separted from the pulp is commonly mixed with a certain amount of the wash water and the mixture constitutes what is commonly referred to as "black liquor".

During the digestion in the soda pulp process a very considerable amount of the wood is dissolved so that the black liquor contains a considerable amount of organic matter in solution and various sodium compounds. The black liquor thus commonly carries about 11 to 11½ grams of solids per 100 cc., and the total soda in the liquor is equivalent to about 5 to 6% of sodium carbonate, this determination being made by permitting 100 cc. of the liquor to dry and igniting the residue, burning off the organic matter and leaving sodium carbonate, etc., behind. The common method of treating the black liquor has been to evaporate a part of the water in evaporators and then feed the concentrated black liquor into an incinerator, the common type being a rotary furnace, where the liquor is further concentrated and finally burned, with decomposition of the organic matter and concentration of the inorganic matter in the black ash, and the black ash is then treated to dissolve the sodium compounds from the insoluble residue or carbon, etc., and the resulting solution is treated for the production of caustic soda for reuse. The organic constituents of the black liquor are consumed or carbonized in the rotary furnace; and the only constituents of the black liquor which are commonly recovered are the sodium compounds, principally as sodium carbonate.

According to the present invention, we treat the black liquor from the soda pulp process with sulfur dioxide or sodium bisulfite, thereby bringing about the separation of organic matter from solution and converting some of the sodium compounds of the liquor into the form of sodium sulfite or bisulfite in solution. The organic matter present in the black liquor is of such a character that much of it can be precipitated from solution by treatment with sulfur dioxide or sodium bisulfite. The precipitated organic matter is separated from the treated liquor by filtration, sedimentation, screening or otherwise. The clarified liquor will now contain a considerable portion of the original soda of the liquor in combination with sulfur dioxide, that is, as a sulfite solution or liquor; and this liquor will moreover be freed from the greater part of the precipitable organic matter.

The sulfite liquor thus produced, by treatment of the black liquor in the manner above described, is made use of, according to the present invention, in carrying out the sulfite pulp process. In case the clarified liquor does not have the desired amount of sodium sulfite or uncombined sulfur dioxide, we add more sodium sulfite or sulfur dioxide thereto. So also, the clarified liquor may be concentrated to give a more concentrated sulfite liquor for use; or the black liquor may be concentrated by any suitable means to the desired concentration before the addition of the sulfur dioxide thereto, so that the organic matter will be removed from the more concentrated liquor, and so that a more concentrated sulfite liquor will be produced by the sulfur dioxide treatment. Instead of adding all of the sulfur dioxide at once to the black liquor, it may be added in stages, for example, sufficient sulfur dioxide may be added to convert the reactive sodium compounds for the most part into sodium sulfite, or with a sufficient excess of suitable acid to bring about a more complete separation of organic matter from the solution, the solution then concentrated either before or after neutralization, and a further amount of sodium sulfite or sulfur dioxide added to the concentrated liquor to give the desired amounts of combined and uncombined acid for use in the sulfite pulp process.

If the liquor still contains an objectionable amount of soluble organic compounds after the addition of the sulfur dioxide in whole or in part, the sodium sulfite contained in the liquor may be recovered to a considerable extent by concentration until the sodium sulfite crystallizes out on cooling, leaving the soluble organic compounds in the mother liquor. The crystallized sodium sulfite thus recovered, together with additions if desired, can then be dissolved in water and the solution then treated with further amounts of sulfur dioxide for the purpose of producing an acid sulfite solution appropriate for use in the sodium bisulfite process (with such additions thereto as may be necessary to make up for losses). The sulfur dioxide for treating the black liquor can, at least in part, be obtained from the cooking liquor in the digester employed in the acid sulfite process, by recovering the sulfur dioxide from the digester in a manner which will be readily understood.

The sodium bisulfite liquor produced as above described, and with appropriate adjustment and regulation of its strength and acidity, can be used to advantage in the carrying out of the acid sulfite process; so that the black liquor of the soda pulp process is thus made available to advantage in the production of a cooking liquor for the sodium bisulfite process.

The bisulfite process which is carried out according to the present invention in conjunction with the soda process, makes use of a sulfite liquor containing uncombined sulfurous acid together with sodium sulfite or bisulfite, instead of calcium bisulfite. The digestion of the wood chips with the sulfite liquor may thus be carried out with a liquor containing twenty grams of sodium bisulfite per liter, and the digestion can be carried out in much the usual way by heating with direct steam at a pressure around fifty to eighty pounds and for a suitable period of time, for example, from 3 to 10 hours. Upon completion of the cook in the sulfite process, when carried out with sulfurous acid and sodium sulfite or bisufite, free sulfur dioxide is "blown" or relieved from the digester at the end of the cook and the pulp is separated from the residual sulfite liquor. The residual sulfite liquor, from the calcium bisulfite process as commonly practiced, is run to waste. According to the present invention, however, the residual sulfite liquor is advantageously treated for the separation and recovery of organic matter therefrom, and for the recovery of the soda contents of the liquor in a form available for use in the carrying out of a soda pulp process.

According to one method of treatment of the residual sulfite liquor, we treat the liquor with a compound of an alkali or of an alkaline earth to neutralize the acidity and to combine with the reactive sulfur dioxide of the liquor. We regard it as more advantageous to use an alkali compound than an alkaline earth compound, so that the alkali sulfite will remain in solution instead of the alkaline earth sulfite being precipitated. The liquor which has been more or less neutralized or made alkaline is then concentrated. It is advantageous to evaporate this liquor by spraying it into hot gases to produce a concentrated liquor; and this concentrated liquor may be again sprayed into hot gases to obtain a substantially dry product; or a substantially dry product may be obtained by one evaporation treatment, by proper regulation of the operation. When this liquor is suitably concentrated, considerable organic matter may be precipitated and removed from the concentrated liquor before evaporation to dryness.

Depending upon the amount of organic matter present in the concentrated liquor or in the dry product, the liquor or dry product can be used for the production of a caustic solution therefrom by different methods of treatment. Where the concentrated liquor is relatively free from organic matter, it can be directly causticized by treatment with lime, with resulting precipitation of calcium sulfite, and further amounts of organic matter may be precipitated from the liquor at the same time. The caustic solution thus obtained can now be used in the carrying out of a soda pulp process. The dry product can similarly be used, by redissolving the soluble sodium sulfite and causticizing with lime. The substantially dry product, especially when organic matter has not been removed, can be burned so as to utilize the fuel value of the organic matter which it contains, leaving an alkaline ash which can then be dissolved in a suitable amount of water and the solution causticized, either with or without the addition of further amounts of causticizable sodium compounds, to produce a caustic liquor suitable for use as a cooking liquor in a soda pulp process. The caustic liquors produced by the above procedures can be further clarified if necessary before use.

Instead of neutralizing the residual sulfite liquor before concentrating, the liquor may be similarly concentrated without neutralization and a dry product obtained containing all of the organic matter of the liquor, and this dry product can be burned to utilize its fuel value and to give an ash which can be treated in the manner above described, that is, by dissolving the soluble sodium compounds and causticizing the solution with lime to give a caustic soda liquor for use in a soda pulp process. The amount of organic matter present in the residual sulfite liquor is so large in amount that it affords a large amount of combustible material, which can replace to an important extent, the fuel now commonly supplied from other sources for carrying out the operations of the pulp mill. When the residual sulfite liquor is neutralized before concentration, and the neutralized liquor is concentrated by a spray evaporation treatment, the organic matter may be left with the liquor so that it will be present in the dry product, and its fuel value made available as above described.

In the concentration of the residual sulfite liquor, and particularly if the liquor is not neutralized before concentration, as well as in the burning of the dry product produced therefrom, sulfur dioxide and other sulfur compounds may be contained in the resulting gases and may be recovered therefrom, and made available for further use.

The caustic liquor which is produced from the residual sulfite liquor by the various methods of procedure above described, can be utilized in carrying out a soda pulp process or the alkaline sulfite process. If the residual sulfite liquor is neutralized with alkaline sodium compounds, the caustic soda solution produced by the subsequent causticizing treatment, may contain a correspondingly increased amount of caustic soda.

According to another method of treatment of the residual sulfite liquor, coming from the digesters or blow pits used in this sulfite process, the liquor is concentrated to remove water therefrom, either before or after treatment with an alkaline compound, and either before or after treatment with sodium sulfate or sodium bisulfate or a mixture of both, to bring about precipitation or coagulation of organic matter. After separation of the organic matter so precipitated or coagulated, the clarified liquor is then treated with a suitable amount of calcium sulfite, in the presence of an amount of uncombined acid sufficient to bring about reaction between the calcium sulfite and the sodium sulfate of the liquor, with resulting precipitation of substantially all of the sulfate as calcium sulfate. The resulting solution will contain sodium sulfite or bisulfite or both. This solution may (after removing the calcium sulfate) then be causticized by treatment with an alkaline earth hydroxide, preferably calcium hydroxide, with resulting precipitation of calcium sulfite which can be recovered and may be reused in the treatment of further quantities of liquor in a similar manner to that above described. Instead of adding calcium sulfite to the liquor as such, the liquor can be treated by adding finely divided calcium carbonate or limestone or calcium hydroxide and treating the mixture with sulfur dioxide, calcium sulfate being formed and precipitated and sodium sulfite or bisulfite being left in solution. The precipitate of calcium sulfite resulting from the causticizing operation may carry an excess of calcium hydroxide or calcium carbonate or both, and this excess can be utilized in the manner above described, that is, by adding the mixture to the liquor containing sodium sulfate and treating with sulfur dioxide. The precipitated calcium sulfate is available for use as a filler for paper and for various other purposes.

It will thus be seen that the soda pulp process and the sulfite process (using sulfurous acid and sodium monosulfite or bisulfite) can advantageously be carried out in conjunction with each other, by operating in the manner above described, so that the residual liquor from the soda or alkaline sulfite pulp process is used in the production of a sulfite liquor for this sulfite process, and so that the residual sulfite liquor is used in making a caustic soda solution for use in a soda pulp process. The residual liquors of either or both processes can thus be used to advantage, while organic matter of the residual liquors can also be recovered at least in part and used as a valuable byproduct of the process.

The treatment of the black liquor and of the residual sulfite liquor can advantageously be combined by treating the acid liquor from the sulfite process with the alkaline black liquor from the soda pulp process, thereby bringing about reaction of the uncombined alkali of the black liquor and of the acid of the residual sulfite liquor, and bringing about a precipitation of organic matter from the admixed liquors. Additional amounts of organic matter may be removed by further concentration either with or without addition of reagents to bring about or promote such removal. The solution from which the organic matter has been to a greater or less extent precipitated and separated, can then be even further concentrated to give a more concentrated liquor or a dry product as desired. The liquor can be causticized to give a caustic solution for use in a soda pulp process; or the liquor can in part be treated with sulfur dioxide to give an acid sulfite liquor for use in the sulfite process; or the liquor can be in part utilized for each of these processes. In treating the black liquor and the residual sulfite liquor with each other, an excess of one or the other of these liquors can be used; for example, an excess of the black liquor so that the admixed liquors will carry an excess of alkali over and above that required for neutralizing all of the free acid and acid compounds of the residual sulfite liquor, and the resulting liquor, with or without removal of organic matter, can then be treated with sulfur dioxide or other suitable acid to neutralize the excess alkalinity and even to acidify the liquor; and this procedure may be more advantageous where the preciptation and separation of as much as possible of the organic matter from the liquors is desired prior to the final concentration or further treatment of such liquor.

We have found that black liquor from processes in which an alkaline liquor is used for cooking the wood is an excellent absorbent for sulfur dioxide, inasmuch as such liquor usually contains a considerable quantity of uncombined alkali and compounds of alkali with organic constituents which are replaceable by sulfur dioxide. The treatment of such liquor with sulfur dioxide is therefore an advantageous treatment for the separation of organic matter from the black liquor and for the production of alkali sulfite or bisulfite in solution. The black liquor can thus be used to advantage for absorbing and recovering sulfur dioxide from the liquor used in the digesters in the acid sulfite process, for example, the sulfur dioxide from the digester during or at the end of the cook, the sulfur dioxide from the blow-pit, or the sulfur dioxide from the subsequent treatment of the sulfite liquor, while the sulfur dioxide itself is not only recovered advantageously in this way but it serves to bring about the separation of organic matter from the black liquor. The organic matter thus separated from black liquor, as well as that separated from the residual sulfite liquor, can be treated for the production of valuable products.

The present invention also includes the treatment of residual liquors from a new method of cooking or digesting wood chips in which the cooking liquor is an alkaline liquor containing a sulfite of an alkali. This method is distinguished from the acid sulfite process, above described, by the fact that an excess of free sulfurous acid or sodium disulfite is absent, and by the fact that caustic soda is present in sufficient amount to given an alkaline cooking liquor of appropriate strength, while sodium sulfite is also present in substantial amount. This cooking method is distinguished from the soda process by the presence in the cooking liquor of a regulated amount of sodium sulfite, in addition to the caustic soda; and it is distinguished from the sulfate process, so-called by, the absence of large amounts of sodium sulfide and the presence of sodium sulfite. The composite cooking liquor, containing caustic soda and sodium sulfite, can vary somewhat in its composition and in the proportions of caustic soda and sodium sulfite. Ordinarily a preponderating proportion of caustic soda will be used, for example, so that from 50 to 90% of the total sodium of the cooking liquor will be present as caustic soda and the remainder mainly as sodium sulfite. A cooking liquor may thus be used containing at least 40 grams of sodium per liter, of which at least 40% is present as sodium hydroxide and at least 5% as sodium sulfite, with the particular amounts of caustic soda and sodium sulfite, varying somewhat above these percentages. By the use of such an alkaline cooking liquor containing sulfites, it is possible to produce satisfactory pulp or cellulose material from forest products and other cellulose-bearing materials which, due to their inherent composition and properties, have been unsuited to the production of high grade cellulose material by the processes heretofore commonly practiced. Materials such as woods and other forest material of inferior value (for treatment according to common methods) as well as materials such as bagasse, reeds, grasses, bamboo, corn stalks, straw, etc., can advantageously be subjected to digestion with such alkaline sulfite cooking liquor and high grade pulp or cellulose material produced therefrom. This method, therefore, increases the available supply of raw materials for the production of high grade pulp or cellulose products.

In carrying out the digestion with such an alkaline sulfite liquor, the time of treatment and the temperature, pressure, etc., can be varied, depending upon the particular wood or other material undergoing digestion; but the process can be carried out under similar conditions of temperature and pressure to those commonly used in the soda or sulfate process. The digestion will, however, be modified by the action of the composite cooking liquor so that less injury to the cellulose material will take place and so that a superior pulp or cellulose material will be produced.

The composite cooking liquor, containing caustic soda and sodium sulfite, may advantageously be obtained by partial causticization with lime of a solution containing sodium sulfite. A solution of sodium sulfite, produced by treatment of the residual liquor of the soda pulp process, in the manners hereinbefore described, may thus be used to advantage in the production of such a composite cooking liquor. The amount of lime required for partial causticizing will be materially less than that required for substantially complete causticizing, so that there will be an economy in the amount of lime required for this purpose. Even when an attempt is made to bring about substantially complete causticizing of a sodium sulfite solution, it is difficult to convert all of the sodium sulfite into caustic soda, and such amounts of sodium sulfite as remain unconverted will form an advantageous addition to the caustic soda liquor used in the soda pulp process; and the soda pulp process can thus be advantageously modified and improved by the addition to or substitution in part for the caustic soda commonly employed of a substantial amount of sodium sulfite.

The alkaline sulfite process can advantageously be carried out in conjunction with the acid sulfite process, by utilizing the residual liquor of the alkali sulfite process for the production of a cooking liquor for use in the acid sulfite process; and by utilizing the residual liquor from the acid sulfite process for producing a cooking liquor for use in the alkaline sulfite process. The residual liquor from the alkaline sulfite process can thus be treated in much the same manner hereinbefore described for treatment of the black liquor from the soda pulp process. That is, instead of treating the black liquor from the soda pulp process for the production of a cooking liquor for use in the acid sulfite process, the residual liquor from the alkaline sulfite process can be similarly treated for the same purpose. So also, the residual liquor from the acid sulfite process can be treated for the production of a cooking liquor for use in the alkaline sulfite process, by treating such residual liquor in the manner hereinbefore described for the production of caustic soda for further use in the soda pulp process, but with only partial causticization so that the liquor will contain both caustic soda and sodium sulfite, instead of caustic soda without any appreciable amounts of uncausticized sodium sulfite.

The present invention also includes improvements in the acid sulfite process whereby the residual liquor from such process is employed in the production of a further amount of cooking liquor for use in this same process. The liquor coming from the digesters or blow-pits of the acid sulfite process (in which sodium acid sulfite or bisulfite is employed) may thus be treated with sufficient alkaline compound to neutralize or fix all or nearly all of the uncombined acid, and the liquor then concentrated in any suitable manner. In case the soluble alkali salts are insufficient to cause or bring about a suitable precipitation or coagulation of organic matter, an agent such as sodium sulfate or bisulfate (nitre-cake) or both may be added in sufficient quantity to bring about such precipitation or coagulation when the liquor is concentrated to a suitable degree, and the precipitated or coagulated organic matter can be separated by filtration, sedimentation, screening, or otherwise. When sodium sulfate or bisulfate or both has thus been added, and the organic matter separated, the clarified liquor can then be treated with calcium sulfite, or with calcium hydroxide or calcium carbonate or limestone, or a mixture of two or more of such compounds, in the presence of a sufficient amount of free acid, to bring about precipitation of calcium sulfate or gypsum and a solution containing sodium sulfite together with some free acid. The reagents are preferably so proportioned that substantially all of the sulfate radical is precipitated as calcium sulfate, leaving in solution substantially sodium sulfite and uncombined sulfurous acid. The solution thus obtained, and containing sodium sulfite and uncombined sulfurous acid in regulated proportions, and after the separation of the precipitated calcium sulfate, is available for reuse in the digester for the cooking of wood chips by the acid sulfite process. If the liquor contains an insufficient quantity of sulfite, the sulfite content, whether combined or uncombined, can be increased in any suitable manner. For instance, it can be used to absorb sulfur dioxide relieved from the digesters during the cooking operation. It is possible, by this process, to produce an excess of sodium sulfite or sodium bisulfite over that which may be required for the sulfite cooking liquor. Such excess may be utilized for the production of a solution of sodium sulfite or bisulfite, or by causticizing, for the production of a solution of caustic soda, or it may be concentrated and sodium sulfite or bisulfite or both crystallized out therefrom. So also, the excess liquor can be utilized for the production of a composite liquor containing caustic alkali and alkali sulfite, by partial causticizing, and such alkaline sulfite liquor can be utilized in the alkali sulfite process hereinbefore described.

The present invention, accordingly, provides a method for the regeneration of liquors coming from the acid sulfite process of cooking wood chips, so that these liquors, after regeneration, can be used in the further carrying out of such process. Residual sulfite liquors have heretofore been a waste product and in many cases a nuisance. The precipitated or coagulated organic matter, which may be separated from the liquor in the manner above described, may be used for fuel or it may be destructively distilled for the purpose of recovering valuable products, or it may be otherwise utilized or disposed of.

Instead of utilizing the residual liquors from the acid sulfite process, in the manner above described, for the production of a cooking liquor for use in the further carrying out of the acid sulfite process, the residual liquor may be in part used for this purpose and in part for the production of a cooking liquor for use in the soda process, as hereinbefore described, or in part for the production of a cooking liquor for use in the alkaline sulfite process, hereinbefore described; while the residual liquor from such soda process or from such alkaline sulfite process can likewise be utilized at least in part for the production of a cooking liquor for use in the acid sulfite process. So also, the residual liquors from the acid sulfite process can be utilized to treat the liquor from the soda pulp process or the residual liquor from the alkaline sulfite process, and the resulting composite liquors, after the separation of organic matter, or after treatment for the removal of further amounts of organic matter, may then be utilized for the production of cooking liquors for use in the various processes from which the combined cooking liquors were produced.

In the carrying out of the cyclic processes, and of the combined processes, hereinbefore described, various soluble organic compounds may accumulate in the liquor to such an extent as to make it feasible to recover them. For example, acetates, formates, oxalates, or other soluble organic compounds may be recovered or removed from the liquor during the cycle, preferably after the separation of the greater portion of the precipitable organic matter. The liquors may be acidified and the volatile organic matters, such as volatile acids, recovered by distillation; or the liquor can be concentrated to such an extent that the soluble organic compounds can be recovered by crystallization. Volatile organic constituents may likewise be removed or recovered in any suitable way. When the content of fermentable sugars has increased to such an extent as to permit profitable fermentation thereof, the liquors may be subjected to fermentation, after suitable neutralization or treatment for the removal of ingredients prejudicial to the fermentation, and the alcohol produced by the fermentation operation can be recovered by distillation and condensation. If soluble organic constituents build up in solution to an objectionable degree, the solution may even be evaporated to dryness and calcined for the removal of such organic materials. Such operation ordinarily need not be carried out except after several operations or cycles.

The sulfur dioxide utilized in the process of the present invention may be obtained from any suitable source. To the extent that it can be recovered in the carrying out of the sulfite process, it is advantageously recovered in this way for reuse. Further amounts of sulfur dioxide sufficient to make up for losses and insure a suitable sulfite cooking liquor in adequate amount may be obtained, for example, by burning sulfur or pyrite in the usual manner, or it may be obtained as a by-product from the roasting or smelting of sulfur-bearing materials, such as sulfide ores, etc. For instance, gases carrying sulfur dioxide in admixture with other gases may be freed in whole or in part from the sulfur dioxide by treating the mixed gases with black liquor from the soda pulp process, or with other liquors containing alkaline compounds or compounds of alkali capable of absorbing sulfur dioxide.

The black liquor from the soda or alkaline sulfite pulp process can be used to particular advantage in the absorption of sulfur dioxide from such gaseous mixture, since it is an excellent absorbent for sulfur dioxide; and this method of absorption and recovery of sulfur dioxide is a particularly advantageous method of treatment of the black liquor, as hereinbefore described. The maximum absorption of sulfur dioxide is more readily obtained when the temperature of the absorbing liquor is not allowed to rise to too high a degree, and where black liquor is used as an absorbent, it is advantageously cooled, or permitted to cool, from the high temperature at which it is discharged from the digester, before it is used as an absorbent, if the maximum absorption is to be obtained. The absorption of sulfur dioxide may even be carried to the point of formation of an acid sulfite liquor which may be subsequently heated or subjected to reduced pressure, or both, for the purpose of removing and recovering gaseous sulfur dioxide therefrom; or the acid sulfite liquor may be utilized directly in the sulfite process, if of appropriate composition.

The carrying out of the combined operations of the present invention, with the utilization of sodium sulfate or bisulfate as a reagent in the manner above described, has certain advantages, among them the promotion of the removal of organic matter from the liquors, especially from residual sulfite liquors, and the supply of an additional amount of combined sodium which is made available in the subsequent steps of the process to increase the total content of available and useful sodium compounds. These reagents are also available in large quantities and at relatively low cost, for example, in the form of sodium bisulfate or nitre cake, which is largely a waste product. Furthermore, a large percentage of high-grade gypsum or calcium sulfate is produced in the carrying out of the process in this way.

It will thus be seen that the present invention includes various improvements in the sulfite pulp process, both when carried out with an acid sulfite cooking liquor and when carried out with an alkali sulfite cooking liquor, as well as novel and advantageous combinations of such processes, and of the sulfite process with the soda pulp process, such that the effluent of the various processes are utilized in an economical and advantageous manner as a foundation for the cooking liquors of the same or different processes.

Furthermore, sodium sulfite or bisulfite may be readily obtained from mixed gases containing sulfur dioxide by treatment of a sulfate of sodium with calcium carbonate or hydroxide and with such gases and this permits the economical recovery and transportation of the sulfur dioxide of such mixed gases in the form of stable and useful compounds, namely, sodium sulfite and bisulfite for use in carrying out the acid sodium sulfite process of cooking wood chips.

Where it is desired to carry out the sulfite process making use of a cooking liquor containing calcium bisulfite, the production of an acid sulfite liquor suitable for use in this process can be combined with the treatment of the effluent liquors from the soda pulp process or from the alkali sulfite process, according to the present invention. When the effluent liquors from the alkali process are treated for the separation of organic matter, by means of sulfur dioxide, and the resulting solution of sodium sulfite is causticized with lime, a precipitate of calcium sulfite is formed. So also, when a solution of sodium sulfite obtained by treatment of the residual liquor of the alkali sulfite process or the acid sulfite process (in which sodium sulfite or bisulfite is used), is causticized with lime, a precipitate of calcium sulfite is produced. Similar precipitates of calcium sulfite can be produced by other methods of procedure, such as are hereinbefore described.

The calcium sulfite precipitate thus produced can be treated with sulfur dioxide in the presence of water to dissolve the calcium sulfite and produce a solution of bisulfite containing a suitable excess of sulfur dioxide to adapt it for use in the sulfite process.

The production of a sulfite liquor in this way for use in the acid sulfite process (in which calcium bisulfite is used) has the advantage over the ordinary method of production, by the direct absorption of sulfur dioxide in milk of lime, that the lime is utilized first for the causticizing of a sodium sulfite solution and is thereafter made available by further treatment with sulfur dioxide in the form of an acid sulfite cooking liquor; while the sulfur dioxide, instead of combining directly with lime, is first utilized in the sodium sulfite process, or in the treatment of residual liquor from an alkali pulp process, and the sodium sulfite is then treated with lime to causticize or partially causticize the sodium sulfite solution and to form a precipitate of calcium sulfite.

The production of calcium sulfite and bisulfite in this way, accordingly, utilizes both the sulfur dioxide and the lime for other purposes before they are finally combined in the form of calcium sulfite; and the combined operations are of such a character that the treatment of residual liquors from other pulp processes for the regeneration of cooking liquors is advantageously combined with the production of calcium sulfite which can be utilized either for the production of an acid sulfite liquor, by treatment with sulfur dioxide, or for the production of calcium sulfate and sodium sulfite, in the manner hereinbefore described.

According to another embodiment of the present invention, a part or all of the sodium sulfite may be replaced by thiosulfate. For example, the alkaline sulfite liquor may be composed of caustic soda and sodium thiosulfate, instead of caustic soda and sodium sulfite, or it may be composed of all three ingredients, namely, caustic soda, sodium sulfite and sodium thiosulfate. The liquor may also contain other compounds than those mentioned, such, for example, as sodium sulfate, sodium carbonate or sodium sulfide.

Our investigations have shown that if some untreated black liquor is mixed with new cooking liquor containing caustic soda, a portion of the caustic soda is used up in the formation of other sodium compounds by reaction either directly or indirectly between the caustic soda and soluble organic compounds, so that the total content of caustic soda is not available for cooking the wood chips in the same way that it would be if no such soluble organic constituents were present. Sodium sulfite and sodium thiosulfate exert a retarding influence upon the reaction between the caustic soda and the soluble organic compounds, and likewise upon the cellulose, so that the caustic soda can act more effectively, and so that the destructive action for the same total amount of caustic soda is minimized.

If, however, the black liquor is treated, in the manner hereinbefore described, so that most of the precipitable organic matter is removed, the resulting liquor, containing sodium acetate and other organic materials, will exert a similar retarding effect upon the destructive action of the caustic soda, so that its action will be beneficially modified, without materially injuring the bleaching quality of the pulp. It is important to use the requisite amount of caustic soda, but its action is beneficially modified by the other reagents in the liquor utilized according to the process of the present invention.

In the claims, the term "cellulosic fibre-bearing material of wood origin" is intended to include fibre-bearing materials obtained from trees of various kinds, and such material may be in various physical forms and of various chemical composition, provided that it is a suitable raw material for the various steps defined in the respective claims wherein such term appears.

In the claims, the term "black liquor" is intended to include various alkaline liquors, without regard to their color, which contain dissolved organic matter obtained from cellulosic fibre-bearing material by means of an alkaline liquor, a substantial portion of such dissolved organic matter being readily thrown out of solution and another substantial portion remaining in solution when the liquor is rendered acid to litmus by means of sulfur dioxide.

We claim:

1. The improvement in the soda pulp process, which comprises causticizing the effluent liquors from a sulfite process, in which a sulfite of sodium is used, to produce a cooking liquor suitable for use in the soda pulp process, and supplying such liquor to such process.

2. The improvement in processes in which an alkaline cooking liquor is employed, which comprises causticizing the effluent liquor from a sulfite process, in which a sulfite of sodium is used, to produce a cooking liquor for use in an alkaline digestion process, and supplying such liquor to such process.

3. The improvement in sulfite pulp processes which comprises carrying on the acid sulfite process, making use of a cooking liquor containing acid sodium sulfite, and an alkali sulfite process, making use of a liquor containing caustic soda and sodium sulfite, and treating the residual liquors from each of such processes respectively for the production of the cooking liquor for use in the other process, said treatment including treatment of the residual liquors of the acid sulfite process with lime for the production of caustic soda and such treatment of the residual liquors from the alkali sulfite process including treatment with sulfur dioxide to form acid sodium sulfite.

4. The improvement in the treatment of residual liquors from an alkaline pulp-making operation in which caustic soda is used as an ingredient of the cooking liquor which comprises treating such residual liquor with sulfur dioxide in amount sufficient to precipitate organic matter, and treating the residual liquor with lime to convert sodium sulfite into caustic soda.

5. The improvement in the treatment of residual liquors which comprises treating a residual liquor from an alkaline pulp-making operation in which caustic soda is used as one of the ingredients of the cooking liquor with residual liquor from an acid sodium sulfite cooking process, and subjecting the resulting liquor in part to causticizing for the production of cooking liquor for the alkaline cooking process and in part to treatment with sulfur dioxide to produce cooking liquor for use in the acid sodium sulfite cooking process.

6. The improvement in the process for producing pulp which comprises carrying on an acid sulfite process with a cooking liquor containing acid sodium sulfite, and carrying on an alkaline sulfite process with a liquor containing sodium sulfite, removing organic matter from resulting residual liquors and treating remaining inorganic material from each of such processes respectively for the production of cooking liquor for use in the other process.

7. In the manufacture of pulp, the cyclic process which comprises cooking cellulosic material in a solution containing a suitable cooking reagent, precipitating and removing organic matter from the residual liquor and forming another cooking liquor, cooking a cellulosic material in such cooking liquor, precipitating and removing organic matter from the resulting residual liquor and treating the resulting solution to adapt it for use as a cooking liquor in the first named cooking process.

8. In the manufacture of pulp, the cyclic process which comprises cooking fibrous material in an alkaline solution containing a suitable base, precipitating and removing organic matter from the resulting liquor by means of an acid radical adapted to form with said base a cooking reagent and forming another cooking liquor, cooking fibrous material in such cooking liquor, precipitating and removing organic matter from the resulting residual liquor and forming a cooking liquor for use in the first named cooking process.

9. In the manufacture of pulp the cyclic process which comprises cooking fibrous material in a solution containing caustic soda, neutralizing the resulting residual liquor with the sulfite radical to precipitate organic matter, removing such precipitate, treating the resulting solution containing sulfite of sodium with an acid sulfite to adapt it for use as a cooking liquor, cooking fibrous material with such cooking liquor, treating resulting residual liquor with calcium hydroxide, separating precipitated matter and treating the remaining solution to adapt it for use as a cooking liquor suitable for use in the first named cooking process.

10. The improved process in the art of producing pulp which comprises treating residual liquor from an acid sodium sulfite digesting process with an alkaline reagent and utilizing resulting liquor for digesting cellulosic fibrous material.

11. The improved process in the art of producing pulp which comprises treating residual liquor from an acid sodium sulfite digesting process with a material adapted to supply sodium hydroxide thereto, and utilizing the resulting liquor for digesting cellulosic fibrous material.

12. The improved process in the art of producing pulp which comprises treating residual liquor from an acid sodium sulfite digesting process with an alkaline compound adapted to supply the liquor with sodium hydroxide and sodium monosulfite, and utilizing the resulting liquor for digesting cellulosic fibrous material.

13. The process which comprises the following steps: treating collulosic fiber-bearing material of wood origin with alkaline material including digestive matter so as to solubilize non-fibrous organic matter thereof, subjecting material comprising organic matter derived from such fiber-bearing material and inorganic matter derived from the digestive matter to a treatment adapted to decompose organic matter thereof, forming digestive matter including a trioxi-sulphur-bearing compound by a treatment which includes a sulphiting step with a material derived at least in part from the first mentioned digestive matter, and treating cellulosic fiber-bearing material therewith so as to solubilize non-fibrous organic matter thereof.

14. The process which comprises the following steps: treating cellulosic fiber-bearing material of wood origin with alkaline material including most of its digestive matter in the form of sulphur-free alkaline compounds so as to solubilize non-fibrous organic matter thereof, subjecting material comprising organic matter derived from such fiber-bearing material and inorganic matter derived from the digestive matter to a treatment adapted to decompose organic matter thereof, forming digestive matter including a sulphite as its principal digestive reagent, said digestive matter being derived at least in part from the first mentioned digestive matter, and treating cellulosic fiber-bearing material therewith so as to solubilize non-fibrous organic matter thereof.

15. The process according to claim 14 in which the treatment whereby the second-named digestive matter is formed is adapted to produce a normal sulphite therein.

16. The process according to claim 14 in which the treatment by which the second-named digestive matter is formed is adapted to produce little or no thiosulphate therein as compared with the amount of sulphite.

17. The process according to claim 14 in which the treatment by which the second-named digestive matter is formed is adapted to produce an acid sulphite therein.

18. The process according to claim 14 in which the second-named digestive matter is derived at least in part from a basic constituent of the first-named digestive matter.

19. The process which comprises the following steps: treating cellulosic fiber-bearing material with alkaline material including most of its digestive matter in the form of sulphur-free alkaline alkali-metal compounds so as to solubilize non-fibrous organic matter thereof and form black liquor, subjecting material comprising organic matter derived from such fiber-bearing material and inorganic matter derived from the digestive matter to a treatment adapted to decompose organic matter thereof, forming digestive matter including a sulphite as its preponderating digestive reagent, said sulphite being derived at least in part from matter present in the alkaline material of the first-mentioned solubilizing step, and treating cellulosic fiber-bearing material therewith so as to solubilize non-fibrous organic matter thereof.

20. The process which comprises the following steps: treating cellulosic fiber-bearing material with alkaline sulphur-bearing material including digestive matter so as to solubilize non-fibrous organic matter thereof and form black liquor, subjecting a material comprising organic matter derived from such fiber-bearing material and inorganic matter derived from the digestive matter to a treatment to decompose organic matter thereof, forming digestive matter including a sulphite as a principal digestive reagent, said sulphite including sulphur derived from sulphur-bearing material present in the alkaline material of the first-mentioned solubilizing step, and treating cellulosic fiber-bearing material therewith so as to solubilize non-fibrous organic matter thereof.

21. The process which comprises the following steps: treating cellulosic fiber-bearing material with alkaline sulphur-bearing material including digestive matter so as to solubilize non-fibrous organic matter thereof and form black liquor, subjecting a material comprising organic matter derived from such fiber-bearing material and inorganic matter derived from the digestive matter to a treatment to decompose organic matter thereof, forming digestive matter including a sulphite, said sulphite including a basic constituent derived from the alkaline material of the first-mentioned solubilizing step, and treating cellulosic fiber-bearing material therewith so as to solubilize non-fibrous organic matter thereof.

22. The process according to claim 13 in which the first-named digestive matter contains a larger portion of its inorganic base in the form of sulfur-free alkaline compounds than in the form of a normal sulfite.

23. The process according to claim 13 in which the first-named digestive matter contains a larger portion of its inorganic base in the form of sulfur-free alkaline compounds than in the form of a normal sulfite and the second-named digestive matter includes a basic constituent derived from said sulfur-free alkaline compounds.

24. The process according to claim 13 in which the first-named digestive matter includes a sulphite and the second-named digestive matter includes sulphur derived from said sulphite.

25. The process according to claim 13 in which the first-named digestive matter includes a sulphite and the second-named digestive matter includes sulphur and a basic constituent derived from said sulphite.

26. The process according to claim 13 in which the first-named digestive matter contains a larger portion of its inorganic base in the form of sulfur-free alkaline sodium compounds than in the form of a sulphur compound and the second-named digestive matter is formed by a treatment which includes decomposing a readily oxidizable sulphur compound.

27. The process according to claim 13 in which the first-named digestive matter includes a sulphur compound and the treatment whereby the second-named digestive matter is formed includes a sulphiting step adapted to form an acid sulphite and a step by which a readily oxidizable sulphur compound is decomposed.

28. The process which comprises the following steps: treating cellulosic fiber-bearing material with digestive matter including a sulphite so as to solubilize non-fibrous organic matter thereof, subjecting material comprising organic matter derived from such fiber bearing material and inorganic matter derived from the digestive matter to a treatment adapted to decompose organic matter thereof, forming digestive matter including a normal sulfite as a principal digestive agent derived at least in part from the first mentioned digestive matter, and treating cellulosic fibre-bearing material therewith so as to solubilize non-fibrous organic matter thereof and form black liquor.

29. The process which comprises the following steps: treating cellulosic fiber-bearing material of wood origin with digestive matter including a sulfite as a principal digestive agent so as to solubilize non-fibrous organic matter thereof, subjecting material comprising organic matter derived from such fiber-bearing material and inorganic matter derived from the digestive matter to a treatment adapted to decompose organic matter thereof, forming digestive matter including a sulfite and little or no thiosulfate as compared with the amount of sulfite, this digestive matter being derived at least in part from the first mentioned digestive matter, and treating cellulosic fiber-bearing material therewith so as to solubilize non-fibrous organic matter thereof.

30. The process according to claim 29 in which the treatment by which the second named digestive matter is formed includes decomposing a readily oxidizable sulfur compound.

31. The process according to claim 29 in which the treatment by which organic matter is decomposed includes a furnacing step.

32. The process which comprises the following steps: treating cellulosic fiber-bearing material of wood origin with digestive matter including a sulfite so as to solubilize non-fibrous organic matter thereof, subjecting material comprising organic matter derived from such fiber-bearing material and inorganic matter derived from the digestive matter to a treatment adapted to decompose organic matter thereof, and treating the resulting inorganic matter so as to form an alkaline liquor including a sulfur-free alkaline sodium compound.

33. The process according to claim 32 in which the treatment by which the alkaline liquor is formed includes a step of separating a sulfur bearing compound from such liquor.

34. The process according to claim 32 in which cellulosic fiber bearing material of wood origin is treated with the alkaline liquor so as to solubilize non-fibrous organic matter thereof.

35. The process which comprises the following steps: treating cellulosic fiber-bearing material of wood origin with an alkaline material including a sulfur compound so as to solubilize non-fibrous organic matter thereof, subjecting material comprising organic matter derived from the fiber-bearing material and inorganic matter derived from the digestive matter to a treatment adapted to decompose organic matter thereof, forming digestive matter by a treatment which includes a sulfiting step, said digestive matter being derived at least in part from the alkaline material, and treating cellulosic fiber-bearing material with the digestive matter so formed so as to solubilize non-fibrous organic matter thereof.

36. The process according to claim 35 in which the treatment by which the last-mentioned digestive matter is formed is adapted to produce sulfite substantially in excess of any thiosulfate which may be present.

37. The process according to claim 35 in which the last-mentioned digestive matter includes a sulfite as a principal digestive agent.

38. The process which comprises the following steps: treating cellulosic fiber-bearing material of wood origin with digestive matter including a sulfur bearing compound so as to solubilize non-fibrous organic matter thereof, subjecting material comprising organic matter derived from such fiber-bearing material and inorganic matter derived from the digestive matter to a treatment adapted to decompose organic matter thereof, forming digestive matter including a sulfite as a principal digestive agent by a treatment which includes treatment of a basic constituent derived from the first mentioned digestive matter with carbon dioxide containing material and a treatment thereof with a sulfur dioxide containing material, and treating cellulosic fiber-bearing material with the digestive matter so formed so as to solubilize non-fibrous organic matter thereof.

39. In the art of treating residual liquors, the process which comprises the following steps: (a) decomposing compounds which contain an organic radical derived from cellulosic fibre-bearing material by a solubilizing treatment thereof by means of an alkaline liquor that contains most of its inorganic alkaline ingredients in the form of sulfur-free alkaline compounds, thereby forming black liquor; (b) preparing an aqueous solubilizing liquor that contains most of its solubilizing reagents in the form of sulfur-bearing constituents which contain matter derived from said alkaline ingredients; (c) subjecting cellulosic fibre-bearing material to a solubilizing treatment by means of aqueous liquor so prepared, thereby obtaining residual liquor which includes dissolved ingredients that contain organic matter derived from the latter fibre-bearing material; (d) decomposing compounds which contain an organic radical derived from the fibre-bearing material by step (c); (e) preparing an aqueous solubilizing liquor which contains an inorganic ingredient formed in step (d); and (f) treating cellulosic fibre-bearing material with such liquor so as to solubilize a portion only of its organic matter.

In testimony whereof we affix our signatures.

LINN BRADLEY.
EDWARD P. McKEEFE.